(12) United States Patent
Öhrn et al.

(10) Patent No.: US 6,402,033 B1
(45) Date of Patent: Jun. 11, 2002

(54) METHOD FOR READING AND WRITING A SMART CARD

(75) Inventors: Jonas Öhrn, Södra Sandby; Martin Algotsson, Helsingborg; Johan Joed, Glumslöv; Daniel Hörstedt, Lund; Thomas Olsson, Åmål, all of (SE)

(73) Assignee: Timelox AB, Landskrona (SE)

( * ) Notice: Subject to any disclaimer, the term of this patent is extended or adjusted under 35 U.S.C. 154(b) by 0 days.

(21) Appl. No.: 09/600,534

(22) PCT Filed: Jan. 20, 1999

(86) PCT No.: PCT/SE99/00076
§ 371 (c)(1),
(2), (4) Date: Sep. 27, 2000

(87) PCT Pub. No.: WO99/38110
PCT Pub. Date: Jul. 29, 1999

(30) Foreign Application Priority Data

Jan. 22, 1998 (SE) .............................................. 9800159

(51) Int. Cl.[7] .................................................. G06K 7/06
(52) U.S. Cl. ...................... 235/441; 235/475; 235/483; 235/486; 235/479; 235/440; 235/492
(58) Field of Search ................................ 235/441, 479, 235/486

(56) References Cited

U.S. PATENT DOCUMENTS

| | | | | |
|---|---|---|---|---|
| 4,724,310 A | * | 2/1988 | Shimamura et al. | 235/483 |
| 4,810,863 A | * | 3/1989 | Kachi et al. | 325/441 |
| 5,036,184 A | * | 7/1991 | Sasaki | 235/479 |
| 5,083,301 A | * | 1/1992 | Matoba et al. | 235/479 X |
| 5,332,890 A | * | 7/1994 | Kitahara | 235/440 |
| 5,780,827 A | * | 7/1998 | Zolkos et al. | 235/441 |
| 6,045,049 A | * | 4/2000 | Nishimura et al. | 235/486 |
| 6,112,997 A | * | 9/2000 | Jelinek et al. | 235/492 |
| 6,138,916 A | * | 10/2000 | Zolkos et al. | 235/475 |

FOREIGN PATENT DOCUMENTS

| | | |
|---|---|---|
| DE | 19501620 A1 | 7/1996 |
| WO | 9733246 A1 | 9/1997 |

* cited by examiner

*Primary Examiner*—Karl D. Frech
*Assistant Examiner*—Allyson Sanders
(74) *Attorney, Agent, or Firm*—Ware, Fressola, Van der Sluys & Adolphson LLP

(57) ABSTRACT

In a method of prolonging an electrical connection between a card that has a readable and a writeable memory and a reader/writer of the card, a writing cycle commenced on the card has time to be completed before the electrical connection is broken. The card is placed in the reader on a sliding carriage that moves with the card, during which time the card and the reader are in electrical contact. An inner contact breaker allows a signal permitting writing on the card when the card reaches its end position. An outer contact breaker allows a signal permitting reading of the card before the card reaches its end position.

2 Claims, No Drawings

METHOD FOR READING AND WRITING A SMART CARD

BACKGROUND OF THE INVENTION

1. Technical Area

The present invention relates to systems with a carrier of data, e.g. in the form of a card, which is intended to be inserted into a data reader. In particular, the invention relates to a method of prolonging the time for a contact connection between a card, e.g. a so-called smart card or another card that has a readable and writeable memory, and a reader/writer for the card.

2. Description of the Prior Art

In many situations today, e.g. for checking and identification to allow access to areas, places of work, equipment and similar, magnetic cards are frequently used as carriers of information. These cards (keys) are intended to be inserted in readers (locks) to allow access for those authorized during a certain time and under certain conditions. It is also known to use a so-called smart card (chip card) as a carrier of information, whereby such cards include both readable and writeable memories, which means that the user can thus receive and provide (with the help of a keyboard) different messages about periods of applicability, codes, accounts, errors, etc. The card and reader are arranged so that data can be transferred from card to reader and vice versa by means of an electrical contact connection. One can thus use the card as a communication link between the reader and a central unit, whereby the central unit can be free-standing (off-line) or directly connected (on-line).

One problem of writing, i.e. registering data in a permanent or temporary manner in a memory, on a smart card that is inserted in a reader is that a cycle of writing on the card must be concluded once it has begun. If the cycle of writing is not concluded, one could get corrupted data on the card. A cycle of writing takes about 5–10 ms to perform and if the supply of current is broken during this time, incorrect data can be written on the card. There must thus be an electrical contact connection between the card and the reader during the whole writing cycle.

To ensure that the writing cycle has time to be completed before the contact with the card is broken, one has previously been forced to "lock" the card in the reader in some way. For example, one has withdrawn the card fully into the reader so that it is not available to the user, or one has held the rear edge of the card with a locking mechanism or physically locked the card in some other way. Such mechanisms are complicated, bulky and costly.

SUMMARY OF THE INVENTION

The object of the invention is to provide a simple and inexpensive method of ensuring that the time for the contact connection between a card and a reader/writer is sufficiently long so that a writing cycle that has commenced has time to be completed before the electrical contact with the card is broken when the card is removed from the reader/writer.

The solution to the problem is to prolong the time for the contact connection. According to the invention, this is achieved by the arrangement of a sliding carriage that moves together with the card along the path between the start position and the end position for the card in the reader/writer, whereby the sliding carriage has at least one electrical contact that is brought into contact with an electrical contact on the card during this passage. Following the establishment of an electrical contact connection between the card and reader, connections are coupled so that reading of the card can commence, i.e. reading of the card can begin before the card has reached its end position. At the end position of the card (and the sliding carriage) connections are coupled so that writing on the card can begin.

Further features of the invention are stated in the accompanying claims.

DETAILED OF THE INVENTION

The invention thus refers to a method of prolonging the time for electrical contact, i.e. the supply of current, between a carrier of data in the form of a smart card and a reader/writer for the card. A smart card is used to collect data, i.e. reading, from a memory or other data medium as well as for the permanent or temporary registration of data, i.e. writing, in a memory or other data medium. By using a smart card that allows both reading and writing, the card constitutes a communication link between the reader/writer and a free-standing or directly connected central unit.

According to one embodiment of the invention, the card is intended to function as a "key" that is to be inserted in a reader/writer that, in connection with a locking mechanism, constitutes the "lock", whereby the lock and the key are intended to be used at hotels, boats, places of work and similar. The card and the reader/writer can naturally be intended for other applications, e.g. equipment, bank and payment terminals, etc.

According to the invention, the reader/writer can be a hybrid reader, i.e. it can read both magnetic cards and smart cards and include both a tone head for reading magnetic cards and contacts for reading and writing smart cards.

As noted above, when writing on smart cards, it is essential that a writing cycle that has begun on the card be completed before the supply of current is broken, to avoid having corrupted data placed on the card.

According to the invention, this problem is solved by prolonging the time during which the card and the reader are in electrical contact with one another. This is achieved by the reader having one or more electrical contacts arranged on a sliding carriage or similar that moves together with the card when the card is inserted into the reader/writer. The card and the reader/writer are thus in electrical contact with one another during the time, or part of the time, that the card moves from its position of insertion, i.e. its start position, to its end position in the reader. In this way, the contact time is prolonged in comparison with conventional readers where the electrical contact first occurs when the card has reached its end position. Naturally, the contact connection is also prolonged when the card is removed from the reader, whereby it is ensured that, in case the user starts to withdraw the card during a commenced writing cycle, the contact connection is not broken before the writing cycle that has begun is completed.

The sliding mechanism can, for example, be designed so that the contacts on the sliding carriage are brought against the contacts on the card in some suitable way during the insertion of the card. According to one embodiment of the invention, reading of the card, i.e. the collection of data from the memory of the card, can commence as soon as this contact connection is established.

The card can, for example, be inserted through a slit in the casing of the reader/writer, whereby it is placed on the sliding carriage arranged on the inside of the slit, after which the card and the sliding carriage are moved to an end position. At this end position, the card can project outwards from the slit to a greater or lesser extent. The card can also be placed on a sliding carriage that is arranged outside of the casing, where the sliding carriage is then moved to and from an end position. A person skilled in the art will realize that there are several ways of arranging the card on a sliding carriage that can be moved from a start position to an end position during the time that an electrical connection is maintained between the reader/writer and the card.

In its simplest form, the sliding carriage constitutes a sliding support mechanism for the card, where the mechanism is equipped with one or more electrical contact mechanisms arranged to come into contact with the electrical contact mechanism of the card after the card has been placed on the sliding carriage that then begins to move towards the end position for the card and sliding carriage.

When the card has reached its final position, i.e. its innermost position, there is an inner contact breaker arranged in the reader/writer that provides a signal allowing writing on the card.

According to one embodiment of the invention, there is also an outer contact breaker arranged in the reader/writer so that when electrical contact connection is established between card and reader, the outer contact breaker allows a signal permitting reading of the card already during the transport of the card (and the sliding carriage) to the end position.

If a writing cycle has begun when a card is to be removed from the reader/writer, the stated design of the card, the sliding carriage with contacts, and the contact breaker guarantees that the writing cycle that has begun will have time to be completed before the electrical contact connection is broken.

If one has begun to withdraw the card during a commenced writing cycle, this is noted by the inner contact breaker ceasing to send a signal. Because of the long contact time of the reader after the inner contact breaker has stopped sending a signal, it is possible for the writing cycle to be completed before the electrical connection is broken.

As will be apparent to persons skilled in the art, the card, card opening/slit and the placement of the card on the sliding carriage and their passage through the reader, the contacts, contact breakers and other electrical arrangements can be designed in a number of different ways to perform the method according to the invention. A more detailed description of these components has thus not been attempted. When designing these components, one has merely to ensure that a sufficiently long time elapses between the point in time when the card is withdrawn from its end position to that point in time when the contact connection between the card and the reader ceases so that a commenced writing cycle has time to be completed.

What is claimed is:

1. Method of prolonging time of a contact connection between an insertable smart card, which is a carrier of data that has a readable and writeable memory, and a reader/writer for such a card, the method comprising steps of:

(a) positioning at least one electrical contact on the reader/writer on a sliding carriage, the carriage being moveable with the card during at least part of passage of the card between a start position and an end position of the card in the reader/writer;

(b) moving the card between the start and end positions so that the card achieves a contact connection with the at least one electrical contact before the end position of the card is reached; and (c) providing a signal via a contact breaker to commence a writing cycle on the card when the card is in the end position, if the signal is broken during withdrawal of the card, the writing cycle which has commenced has time to be completed during passage from the end position until the electrical contact connection is broken.

2. Method according to claim 1, further comprising the step of providing a signal via an outer contact breaker that permits reading of the card when the contact connection has been established.

* * * * *